ns Patent [19]

Bontinck et al.

[11] 3,882,061
[45] May 6, 1975

[54] METHOD OF MANUFACTURING AN ARTIFICIAL PAPER

[75] Inventors: Walter Bontinck, Engelhoekstraat, 30, 9852 Saint Martens-Leerne; Willy De Coster, Mageleinstraat, 15, 9000 Gent, both of Belgium

[73] Assignee: UCB, Societe Anonyme

[22] Filed: Dec. 27, 1973

[21] Appl. No.: 428,743

Related U.S. Application Data

[62] Division of Ser. No. 158,060, June 29, 1971.

[30] Foreign Application Priority Data

July 3, 1970 Belgium .............................. 752917

[52] U.S. Cl. ...... 260/23.7 M; 260/23 XA; 260/235; 260/23 H; 260/23.7 H; 260/33.6 AQ; 260/33.6 PQ; 260/33.6 UA; 260/42.21; 260/42.24; 260/42.43; 260/42.46; 260/42.47; 260/42.49; 260/42.52; 260/888; 260/889; 260/896; 260/897 A; 260/897 B; 260/897 C

[51] Int. Cl. ........................ C08f 29/12; C08f 45/04

[58] Field of Search...... 260/41, 889, 897 A, 897 B, 260/897 C, 896, 888, 23 S, 23 XA, 23 H, 23.7 HM, 33.6 AQ, 33.6 PQ, 33.6 UA, 42.21, 42.24, 42.43, 42.46, 42.49, 42.47, 42.52

[56] References Cited
UNITED STATES PATENTS 3,758,661  9/1973  Yamamoto et al. ................ 264/230

FOREIGN PATENTS OR APPLICATIONS 1,934,096  2/1970  Germany
1,240,586  7/1971  United Kingdom

*Primary Examiner*—James H. Derrington
*Attorney, Agent, or Firm*—Wenderoth, Lind & Ponack

[57] ABSTRACT

The present invention relates to an artificial paper of improved physical characteristics yet which retains the advantageous properties of cellulose paper and composition for the production thereof.

This novel artificial paper is comprised of (a) at least one of a specific class of rigid polyolefins, (b) at least one specific class of polymers incompatible with the rigid polyolefin and (c) at least one of a specific class of macromolecular materials which produce compatability of (a) and (b).

8 Claims, No Drawings

METHOD OF MANUFACTURING AN ARTIFICIAL PAPER

This is a division, of application Ser. No. 158,060, filed June 29, 1971.

The present invention relates to a film resembling paper and to processes for the manufacture thereof.

If the properties of an ordinary cellulose paper are compared with those of any film of synthetic materials, for example of polyethylene, polypropylene, polyvinyl chloride, polystyrene, etc., it is found that the cellulose paper is characterized by lower specific strengths and elongations at break and by greater rigidity. Moreover, the resistance to tearing of cellulose paper is relatively poor and practically equal in both directions of the plane of the paper. Apart from these measurable properties, cellulose paper is characterized by some specific properties, namely:

1. appearance.
2. touch.
3. permanent deformation after folding.
4. absence of or a low static electricity charge.
5. ability to be written on by a pencil, pen, ballpen, etc.
6. ability to be printed on by various processes: letterpress, offset, photogravure, etc.

If it is desired to produce a synthetic film resembling paper, it is therefore necessary to provide the specific properties characterizing the latter. At the same time, the synthetic materials may provide additional properties not possessed by cellulose paper, such as impermeability to water vapor and gases, resistance to greases, dimensional stability under various atmospheric conditions, and sealability.

Various means have already been adopted in attempts to imitate cellulose paper.

Some have attempted to imitate appearance alone, by surface treatment. A synthetic film may for example be treated by one of the following processes:

a. sand blasting;
b. passing over a rough heated roller;
c. chemical treatment: passing the film through a bath of solvent, followed by passage through a bath containing a non-solvent for the polymer which is however miscible with the first solvent;
d. coating the film with a highly pigmented layer;
e. extrusion by a specific method.

By these surface treatments the opaqueness and the feel of paper are obtained. The base polymer in the film provides the mechanical properties. This film may or may not be oriented.

By chemical treatment with the system comprising the solvent and the non-solvent it is also possible to obtain a certain porosity, but an important advantage of plastics paper, that is to say its impermeability and resistance to liquids, is then partly lost.

One of the first attempts to make a synthetic paper consisted in producing a porous film by incorporating, during extrusion, an expansion agent which forms cavities in the film (for example expanded polystyrene). This film however is difficult to print on and it suffers both from poor impermeability and from poor resistance to liquids (spongy effect).

There are also so-called "paper-like" films, which are simple films the paper-like feel of which is obtained by a controlled melt fracture phenomenon during extrusion. These films are normally manufactured to form a film imitating tissue paper.

So-called "spun-bonded" artificial papers also exist, which are papers manufactured with synthetic fibres instead of cellulose fibres. These papers may also be subsequently coated.

Another type of artificial paper is obtained from a composition containing at least one high density polyethylene, a copolymer of ethylene and a vinyl compound (for example vinyl acetate, acrylic ester, etc.), mineral fillers, and unmodified polystyrene. This mixture must first be calendered before its extrusion.

More recently there has been proposed an artificial paper composed of (a) olefinic resins, (b) resins of the group comprising styrene resins, acrylic resins, acetal resins, phenol resins, (c) fillers and (d) optionally a synthetic elastomer, this mixture likewise being calendered, extruded, and then additionally subjected to bi-orientation.

Without prejudging the quality of the various artificial papers obtained by the processes mentioned above, it will be noted that the cost of manufacture is burdened by operations such as calendering, which consumes a large amount of energy, and biorientation, which requires special equipment and an elaborate technique.

An important technical and economic improvement would be made if it were possible to manufacture an artificial paper having the maximum resemblance to cellulose paper, while the cost of manufacture is reduced to a minimum. In other words, it would in particular be necessary to be able to develop an artificial paper composition permitting the direct production of the desired paper by simply mixing the components and by simple extrusion, without calendering or biorientation. The present invention relates to the solution of this problem.

The process according to the invention for the manufacture of an artificial paper requiring neither calendering nor biorientation comprises homogenizing in a conventional rotary mixer a composition containing the following:

30–94.8 percent by weight of at least one rigid polyolefin (A) selected from the group consisting of homopolymers and copolymers of ethylene, propylene, and butylene, and also mixtures thereof, having a melt index of at most 1 decigramme per minute;

0.1 to 35 percent by weight of at least one polymer (B) which is incompatible with the rigid polyolefin (A) and which when extruded by itself produces a brittle film and which has a melt index lower than 10 decigrammes/minute, the polymer (B) being selected from the group consisting of homopolymers and copolymers containing a preponderant amount of a polymerizable, ethylenically-unsaturated monomer, containing a terminal vinylidene group

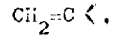

selected from the group consisting of styrene, styrene halo- or alkyl-substituted on the side chain or on the nucleus, vinyl chloride, vinylidene chloride, acrylic acid esters and methacrylic acid esters of alkanols containing 1 to 3 carbon atoms;

0.1 to 35 percent by weight of a macromolecular material (C) producing compatibility between (A) and (B), selected from the group consisting of (1)

copolymers containing at least one monomer selected from the group consistng of ethylene, propylene, and butylene, and at least one monomer selected from the group consisting of isobutylene, butadiene, and isoprene, and (2) a mixture prepared in advance from at least one homopolymer of ethylene, propylene, or butylene and at least one homopolymer of isobutylene, butadiene, or isoprene, this material having a melt index of at most 2 dg/minute;

5–45 percent by weight of an inorganic filler (D) having a granulometry lower than 50 microns;

0 to 10 percent by weight of adjuvants (E) selected from the group consisting of antioxidizing agents, heat stabilizers, optical bleaching agents, pigments, coloring agents, antistatic agents and lubricants, in that the mixture thus homogenized is subjected to extrusion in order to obtain an artificial paper, and that the artificial paper thus obtained, if desired, is subjected to surface treatment.

By rigid polyolefin (A) is understood a high density polyethylene, an isotactic polypropylene, or an isotactic polybutene which has a melt index (M.I.) of at most 1 decigramme/minute, preferably lower than 0.2 decigramme per minute, measured according to the standard ASTM D 1238/57T. Nevertheless, the rigid polyolefin (A) may also consist of a physical mixture of these homopolymers with one another, or of copolymers obtained from ethylene, propylene, and/or butene.

In the form of a film the polyolefin (A) has a modulus of elasticity higher than 2,000 kg per cm$^2$, measured according to the standard ASTM D 882/61T. The polyolefin (A) is used in the composition according to the invention at the rate of 30–94.8 percent by weight, preferably from 40 to 80 percent by weight; it provides the artificial paper of the invention with rigidity and constitutes its framework.

The polymer (B), which is incompatible with the rigid polyolefin (A) and which when extruded by itself supplies a brittle, hard, fragile film, is obtained by polymerization of a preponderant quantity of a polymerizable, ethylene-unsaturated monomer having the end group

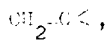

selected particularly from the group consisting of styrene, styrene halo- and alkyl-substituted on the side chain or on the nucleus, vinyl chloride, vinylidene chloride, acrylic acid and methacrylic acid esters of alkanols containing 1 to 3 carbon atoms, etc. In the composition of the invention the polymer (B) imparts hardness and tearability to the artificial paper manufactured from this composition. Nevertheless, the properties of the polymer (B) may be modified by the conjoint utilisation of minor amounts of olefinic or diolefinic elastomers, derived for example from isobutylene, butadiene, isoprene, etc., in a proportion representing at most 49 percent by weight of the polymer (B). It is also possible to modify the polymer (B) by external plastification with conventional plasticizers for vinyl resins, such as for example dioctyl phthalate, tricresyl phosphate, in an amount of 0.1 to 30 percent by weight of the polymer (B). The M.I. of the polymer (B) must be lower than 10 decigrammes per minute, preferably lower than 5. The polymer (B) is used in an amount from 0.1 to 35 percent by weight, preferably from 5 to 30 percent by weight, of the total composition of the invention.

The macromolecular material (C) provides compatibility in the molten state between the polyolefin (A) and the polymer (B). It is obtained in two ways: (1) by copolymerisation of two monomers, one of which is compatible with the polyolefin (A), for example ethylene, propylene, or butylene, and the other is compatible with the polymer (B), for example isobutylene, butadiene, isoprene, or else (2) by a previous mixing of a polymer compatible with the polyolefin (A) and a polymer compatible with the polymer (B). As examples of macromolecular materials (C) mention will be made of a 50/50 ethylene/isobutylene copolymer, or a 75/25 ethylene-butadiene copolymer; as examples of mixtures of the polymer compatible with (A) and of another polymer compatible with (B) mention will be made of a mixture of high or low density polyethylene and polyisobutylene in a 50/50 ratio, a mixture of high or low density polyethylene and polybutadiene in a 75/25 ratio, a 70/30 mixture of high density polyethylene and butyl rubber, etc. Through its presence the macromolecular material (C) (copolymer or mixture of polymers) makes it possible to obtain a homogeneous composition according to the invention without using calendering, the homogeneity of the composition of the invention being simply obtained in the mixer and the extruder itself. The M.I. of the macromolecular material (C) must be of at most 2 decigrammes per minute, preferably lower than 1 decigramme per minute. It is used in the composition of the invention at the rate of 0.1 to 35 percent by weight of the total mixture, preferably at the rate of 0.1 to 25 percent by weight.

The inorganic filler (D) is selected from inorganic substances which impart opaqueness and a suitable surface structure to the artificial paper of the invention. It may consist of talc, titanium dioxide, kaolin, zeolites, silica, zinc oxide, natural or precipitated calcium carbonate, magnesium carbonate, barytine, etc.

The granulometry of the inorganic filler will as a maximum amount to 50 microns. Granulometry higher than this limit is disadvantageous because of the formation of grains which are detrimental to the uniformity of the artificial paper. The amount of inorganic filler added represents from 5 to 45 percent by weight of the total composition of the artificial paper of the invention, preferably from 5 to 25 percent by weight.

The adjuvants (E) are constituted by:

a. thermal stabilizers such as diphenylthiourea, alpha-phenyl-indol, barium, cadmium, or zinc palmitate or stearate, tris-nonylphenyl phosphite, etc.

b. antioxidizing agents such as 4,4'-thio-bis(6-t-butyl-metacresol), 4,4'-methylene-bis(2,6-di-t-butylphenol), butylated hydroxytoluenes, etc.

c. optical bleaching agents, such as sulfonated derivatives of stilbene.

d. organic coloring agents such as the phthalocyanines, disazoic coloring agents, chlorinated indanthrenes, etc.

e. inorganic pigments such as zinc chromate, cadmium sulfide, iron oxide, etc.

f. lubricants such as magnesium and calcium stearate, paraffin oil, etc.

Thes adjuvants (E) are added to the composition of the artificial paper according to the invention in an amount ranging from 0 to 10 percent by weight.

The components (A), (B), (C), (D), and (E) are mixed together in a mixer of conventional construction, preferably in an ordinary rotary mixer. The composition of the invention therefore makes it possible to eliminate calendering and subsequent granulation before extrusion, which constitutes a considerable saving in manufacturing costs.

A suitable way of preparing this mixture consists in adding components (A), (B), and (C) with a lubricant to the rotary mixer, then adding to the resulting mixture the components (D) and (E), which are in the form of a powder. This technique is not necessary if the components (D) and (E) are added in the form of a master batch. As a rule the length of the operation of mixing in the rotary mixer amounts at most to 60 minutes and is preferably from 10 to 45 minutes, at ambient temperature.

The homogeneous mixture thus obtained is subjected to extrusion in an apparatus of conventional design, in which the mixture is brought to a temperature achieving at most 290°C. The extrusion temperature may vary between 100°C 290°C in dependence on the composition of the mixture. Moreover, while remaining within the temperature limits specified above, temperature gradients may exist from the supply zone of the extruder to the end zone of the extrusion die, The extruder may contain one of more extrusion screws; it is merely inportant in each or that the composition obtained should be perfectly homogeneous at the outlet of the die.

The die should in turn be constructed so that the extruded film has a regular final calibre.

If desired, the properties of the artificial paper obtained at the outlet of the die are such that subsequent biorientation is unnecessary, which provides a second considerable saving in the manufacturing process according to the invention.

The artificial paper according to the invention may then undergo surface treatment to improve subsequent printability. This treatment, which is well known in the field of plastics, may consist in subjecting the paper to the action of a flame, corona effect, oxidizing chemical agents, etc.

If desired, the surface treatment of the paper as described above may be preceded by an operation of embossing its surface, in which the film passes between profiled heated rollers, thus making it possible to impart to the film a grainy appearance, a linen paper appearance, or any other appearance desired.

The invention is illustrated by the following non-limitative examples.

EXAMPLE 1

The following are mixed in a rotary mixer:

50 percent by weight of a high density polyethylene having a melt index of 1 dg/min (component A)

15 percent by weight of a mixture of the impact polystyrene type containing 90 percent polystyrene and 10 percent polybutadiene, with a melt index of 3 dg/min under a pressure of 100 psi (7 kg/cm$^2$) (component B)

20 percent by weight of a 50/50 mixture of polyethylene and polyisobutylene with a melt index of 0.2 g/min (component C)

10 percent by weight of titanium dioxide passing through a 50 micron screen (component D)

4 percent by weight of precipitated calcium carbonate passing through a 50 micron screen (component D)

1 percent by weight of paraffin oil (component E).

The components (A), (B), and (C) are wetted with the compound (E) before incorporating the fillers (D), and the ingredients are mixed for 35 minutes at ambient temperature. The mixture obtained in this manner is then passed into a laboratory extruder of the type L = 20 D, with a round die, at a temperature of 235°C.; the bubble is blown to three times the dimension of the die. After passing between pressing rollers the film is wound. The film is then subjected to corona treatment on one face. The final paper obtained in this manner has the appearance of glazed cellulose paper on which it is possible to write with a pencil, pen, or ballpen.

The properties of the artificial paper obtained in this example are shown in the following table:

Table I

| | | | |
|---|---|---|---|
| Thickness of paper | | microns | 150 |
| Density of paper | | | ≤1 |
| Breaking load | SM | kg/cm$^2$ | 190 |
| (ASTM D 882/61T) | ST | | 115 |
| Elongation at break | SM | % | 13 |
| (ASTM D 882/61T) | ST | | 11 |
| Apparent elastic limit | SM | kg/cm$^2$ | nil |
| (ASTM D 882/61T) | ST | | |
| Modulus of elasticity | SM | kg/cm$^2$ | 7,600 |
| (at a traction speed of | ST | | 7,400 |
| 10 mm/min) | | | |
| Resistance to tearing | SM | g/sheet | 67 |
| (ASTM D 1922/61T) | ST | | 74 |
| Resistance to bursting | | Kg | 1.85 |
| (Mullen Burst, ASTM 774/67 | | sag mm | 3.7 |
| Impact resistance | | g | 50 to 90 |
| (ASTM D 1709/67) | | | |
| Rigidity | SM | mg/sheet | 87 |
| (ASTM D 747/63) | ST | | 113 |
| Coefficient of friction | | static | 0.5 |
| Film on film (ASTM D 1894/63 | | dynamic | 0.3 |
| Permeability water to vapor | | g/m$^2$/24h | 2 |
| (ASTM E 96/66) | | | |
| Permeability to air * | | ml/m$^2$/atm/24h | 90 |
| (ASTM D 1434/58) | | | |
| Dimensional variations in % | SM | 75°C | +0.04 |
| at the temperature of | ST | | +0.17 |

Table I - Continued

|  |  |  |  |
|---|---|---|---|
|  | SM | 100°C | − 1.23 |
|  | ST |  | − 0.16 |
| Softening temperature | Start | °C | 121° |
|  | Total |  | 133° |
| Dimensional variations in | SM |  | nil |
| % in 24h in water at 20°C | ST |  | nil |
| SM = machine direction |  |  |  |
| ST = transversal direction |  |  |  |

* number of ml of air passing through a 1 m² film, with a pressure difference of 1 atmosphere between the faces of the film, in 24 hours.

In this table the properties of tearability, impact resistance, rigidity, and permeabilities are properties which depend on the thickness of the paper, while the breaking load, elongation at break, and modulus of elasticity are properties independent of the thickness of the paper.

This table shows that the artificial paper according to the invention possesses mechanical properties similar to those of a cellulose paper and that in this regard it is very different from an ordinary film of plastics material. In addition, foldability and tearability are likewise of the same kind as those of glazed paper. Nevertheless, the paper of the invention has the advantage over cellulose paper of possessing better impermeability to water vapor and air and of having remarkable dimensional stability under variable climatic conditions. Moreover, unlike ordinary paper, it withstands water perfectly.

EXAMPLE 2

The following are mixed in an ordinary rotary mixer:

35 percent by weight of a high density polyethylene having a melt index of 0.4 dg/min (component A)

14 percent by weight of a styrene-butadiene (90/10) copolymer having a melt index of 3.5 dg/min under a pressure of 100 psi (7 kg/cm²) (component B)

20 percent by weight of an ethylene-isobutylene (50/50) copolymer having a melt index of 0.2 dg/min (component C)

20 percent by weight of a master batch of titanium dioxide and of high density polyethylene (60/40) having a melt index of 8 dg/min (components A and D)

10 percent by weight of a master batch of calcium carbonate and of high density polyethylene (50/50) having a melt index of 4 dg/min (components A and D)

1 percent by weight of antistatic agent (component E) consisting of a mixture of $C_{12}$–$C_{18}$ alkylamines, at ambient temperature for a period of 25 minutes. The homogenized mixture obtained in this manner is extruded in the same extruder and with the same conditions of operation as in Example 1.

The artificial paper obtained in this manner possesses characteristics similar to those of the paper prepared in Example 1.

EXAMPLE 3

The following are mixed in a rotary mixer:

12 percent by weight of isotactic polypropylene having a melt index equal to 1 dg/min and 39 percent by weight of high density polyethylene having a melt index equal to 1 dg/min (component A), 10 percent by weight of a mixture of polystyrene and polybutadiene (80/20) having a melt index equal to 4 dg/min under a pressure of 300 psi (21 kg/cm²) (component B), 23 percent by weight of a mixture of high density polyethylene and butyl rubber (70/30) with a melt index equal to 2 dg/min (component C), 10 percent by weight of a master batch consisting of a 50/50 mixture of titanium dioxide and high density polyethylene with a melt index equal to 5 dg/min (component A + D), 5 percent by weight of precipitated calcium carbonate (component D), 0.9 percent by weight of paraffin oil (component E), and 0.1 percent by weight of optical bleaching agent (component E), at ordinary temperature for a period of 35 minutes. The homogenized mixture obtained in this manner is extruded in the same extruder and under the same conditions of operation as in Example 1.

The properties of the artificial paper obtained are similar to those of the paper prepared in Example 1.

The artificial paper of the invention can be printed in particular by the following processes: offset, litho, letterpress, gravure, flexography, silk screen, it can be impulse or heat sealed, it can be stuck on ordinary paper with glues normally suitable for polyethylene, it can be laminated on different types of film, on cellophane, etc., with the aid of standard glues, it is thermoformable, so that embossing can be carried out and any desired surface structures obtained by simply passing over heated rollers.

The artificial paper manufactured according to the present invention can be used for making maps of any kind: tourist maps, topographical maps, road maps, etc., for printing instructions on official documents (driving licences, hunting permits, fishing permits), for forms, catalogues, etc.

The synthetic paper according to the invention can also be used for any artistic printing application and for posters displayed outdoors.

It can also be used for printing childrens' books because the pages are washable with water. As the synthetic paper of the invention does not form dust, it is recommended for special applications in certain industries (for example the manufacture of transistors) where the presence of dust is not allowable.

The artificial paper of the invention is very particularly recommended for use in places where oil or grease is found, for example as manuals for the greasing of cars, machines, etc., as self-adhesive labels resisting oils and greases, etc.

We claim:

1. A composition for the manufacture of artificial paper requiring neither calendering nor biorientation, which comprises 40 to 80 percent by weight of at least one rigid polyolefin (A) selected from the group consisting of homopolymers and copolymers of ethylene, propylene, and butylene, and also mixtures thereof, and having a melt index of at most 1 dg./min.;

5 to 30 percent by weight of at least one polymer (B) which is incompatible with the rigid polyolefin (A) and which when extruded by itself produces a brittle film which has a melt index lower than 10 dg./min., the polymer (B) being selected from the group consisting of homopolymers and copolymers containing a preponderant amount of styrene, an amount within the range of 20 to 25 percent by weight of a macromolecular material (C), said amount being sufficient to produce compatibility between (A) and (B), selected from the group consisting of copolymers of at least one monomer selected from the group consisting of ethylene, propylene, and butylene, and at least one monomer selected from the group consisting of isobutylene, butadiene, and isoprene, and said macromolecular material having a melt index of at most 2 dg./min.;

5 to 45 percent by weight of an inorganic filler (D) having a granulometry lower than 50 microns;

0 to 10 percent by weight of adjuvants (E) selected from the group consisting of antioxidizing agents, thermal stabilizers, optical bleaching agents, pigments, coloring materials, antistatic agents, and lubricants.

2. A composition according to claim 1, in which the polyolefin (A) is selected from the group consisting of high density polyethylene, isotactic polypropylene, and isotactic polybutene.

3. A composition according to claim 1, in which the polyolefin (A) is a physical mixture of at least two polyolefins selected from the group consisting of high density polyethylene, isotactic polopropylene, and isotactic polybutene.

4. A composition according to claim 1, in which the polyolefin (A) is a copolymer obtained from at least two olefins selected from the group consisting of ethylene, propylene and butylene.

5. A composition according to claim 1, in which the polymer (B) is a mixture containing a major amount of a homopolymer of styrene and a minor amount of a homopolymer obtained by polymerization of an olefinic compound selected from the group consisting of isobutylene, butadiene, and isoprene.

6. A composition according to claim 1, in which the polymer (B) is a copolymer obtained by polymerization of a major amount of styrene and a minor amount of a polymerizable olefinic monomer selected from the group consisting of isobutylene, butadiene, and isoprene.

7. A composition according to claim 1, in which the macromolecular material (C) is selected from the group consisting of a 50/50 ethylene-isobutylene copolymer and a 75/25 ethylene-butadiene copolymer.

8. An artificial paper requiring neither calendering nor biorientation, produced by a process which comprises homogenizing in a conventional rotary mixer a composition containing:

40 to 80 percent by weight of at least one rigid polyolefin (A) selected from the group consisting of homopolymers and copolymers of ethylene, propylene, and butylene, and also mixtures thereof, and having a melt index of at most 1 dg./min.;

5 to 30 percent by weight of at least one polymer (B) which is incompatible with the rigid polyolefin (A) and which when extruded by itself produces a brittle film which has a melt index lower than 10 dg./min., the polymer (B) being selected from the group consisting of homopolymers and copolymers containing a preponderant amount of styrene, an amount within the range of 20 to 25 percent by weight of a macromolecular material (C), said amount being sufficient to produce compatibility between (A) and (B), selected from the group consisting of copolymers of at least one monomer selected from the group consisting of ethylene, propylene, and butylene, and at least one monomer selected from the group consisting of isobutylene, butadiene, and isoprene, and said macromolecular material having a melt index of at most 2 dg./min.;

5 to 45 percent by weight of an inorganic filler (D) having a granulometry lower than 50 microns;

0 to 10 percent by weight of adjuvants (E) selected from the group consisting of antioxidizing agents, thermal stabilizers, optical bleaching agents, pigments, coloring materials, antistatic agents, and lubricants; the mixture thus homogenized being subjected to extrusion to obtain an artificial paper and the artificial paper, thus obtained, if desired being subjected to surface treatment.

* * * * *